(12) United States Patent
Lee

(10) Patent No.: US 8,599,664 B2
(45) Date of Patent: Dec. 3, 2013

(54) METHOD AND APPARATUS FOR DETERMINING UNBALANCED DISC AND OPTICAL INFORMATION STORAGE MEDIUM SYSTEM USING THE SAME

(75) Inventor: Jong-jin Lee, Seoul (KR)

(73) Assignee: Toshiba Samsung Storage Technology Korea Corporation, Suwon-si ( * ) Notice: Subject to any disclaimer, the term of this patent is extended or adjusted under 35 U.S.C. 154(b) by 0 days.

(21) Appl. No.: 13/488,042

(22) Filed: Jun. 4, 2012

(65) Prior Publication Data

US 2012/0320724 A1 Dec. 20, 2012

(30) Foreign Application Priority Data

Jun. 16, 2011 (KR) .................. 10-2011-0058643

(51) Int. Cl.
*G11B 7/00* (2006.01)
(52) U.S. Cl.
USPC ............... 369/53.14; 369/53.15; 369/53.19; 369/53.23; 369/44.32
(58) Field of Classification Search
None
See application file for complete search history.

(56) References Cited

U.S. PATENT DOCUMENTS

| 6,912,190 B2 * | 6/2005 | Inokuchi et al. ........... 369/59.15 |
| 2004/0013066 A1 | 1/2004 | Oono et al. |
| 2005/0081626 A1 | 4/2005 | Lin et al. |

FOREIGN PATENT DOCUMENTS

| KR | 10-0295229 B1 | 7/2001 |
| KR | 10-2006-0101705 A | 9/2006 |
| KR | 10-0749764 B1 | 8/2007 |
| KR | 10-0925218 B1 | 11/2009 |

OTHER PUBLICATIONS

Korean Office Action issued Oct. 12, 2012 in counterpart Korean Patent Application No. 10-2011-0058643 (3 pages, in Korean).

\* cited by examiner

*Primary Examiner* — Muhammad N Edun
(74) *Attorney, Agent, or Firm* — NSIP Law

(57) ABSTRACT

An unbalanced disc determining apparatus is provided. The unbalanced disc determining apparatus includes a noise reduction unit configured to reduce noise components of a center error signal obtained from a signal configured to detect light reflected by a disc revolved by a spindle motor, and a determination unit configured to determine whether the revolving disc is unbalanced by determining whether the center error signal of which noise is reduced exceeds a reference value.

19 Claims, 5 Drawing Sheets

METHOD AND APPARATUS FOR DETERMINING UNBALANCED DISC AND OPTICAL INFORMATION STORAGE MEDIUM SYSTEM USING THE SAME

CROSS-REFERENCE TO RELATED PATENT APPLICATION

This application claims the benefit of Korean Patent Application No. 10-2011-0058643, filed on Jun. 16, 2011, in the Korean Intellectual Property Office, the entire disclosure of which is incorporated herein by reference for all purposes.

BACKGROUND OF THE INVENTION

1. Field of the Invention

The following description relates to a method and apparatus for determining an unbalanced disc and an optical information storage medium system using the same.

2. Description of the Related Art

Recently, various types of optical information storage medium systems that write/read data in/from a disc-type optical information storage medium have been widely used. The disc-type optical information storage medium may be a compact disc (CD), a digital versatile disc (DVD), or a blu-ray disc (BD). In response to an arbitrary optical information storage medium being installed in an optical information storage medium system, the optical information storage medium system performs a series of initial operations to determine the type of the optical information storage medium, and then the optical information storage medium system determines whether the optical information storage medium is unbalanced. In response to a determination that a disc mounted in the optical information storage medium system is unbalanced, a maximum recording speed or a maximum reproducing speed, which is previously set, is decreased to allow a performance of stable data recording or data reproducing.

However, in response to an unbalanced disc being incorrectly determined to be a normal disc due to an error during a determination operation of the unbalanced disc, the maximum recording speed or the maximum reproducing speed is maintained. Thus, a fatal error may occur during data recording or data reproducing.

SUMMARY OF THE INVENTION

In one general aspect, an unbalanced disc determining apparatus is provided. The unbalanced disc determining apparatus includes a noise reduction unit configured to reduce noise components of a center error signal obtained from a signal configured to detect light reflected by a disc revolved by a spindle motor, and a determination unit configured to determine whether the revolving disc is unbalanced by determining whether the center error signal of which noise is reduced exceeds a reference value.

The noise reduction unit may include a band pass filter configured to block noise components included in the center error signal.

The noise reduction unit may further include an integrator configured to integrate a center error signal that has passed through the band pass filter.

The light reflected by the disc may be light used to record information in the disc and/or reproduce information from the disc.

The center error signal may be obtained from a push-pull signal detected by receiving the light reflected by the disc.

The unbalanced disc determining apparatus may further include a gain adjuster configured to reduce a deviation of a size of the center error signal by adjusting a gain of the center error signal.

In another aspect, an unbalanced disc determination method is provided. The unbalanced disc determination method includes, reducing noise components of a center error signal from a signal having detected light reflected by a disc revolved by a spindle motor, and determining whether the disc is unbalanced by comparing the center error signal of which noise is reduced with a reference value.

The reducing of the noise components may include allowing the center error signal to pass through a band pass filter configured to block the noise components of the center error signal.

The reducing of the noise components may further include integrating the center error signal that has passed through the band pass filter.

The method may further include reducing a deviation of a size of the center error signal by adjusting a gain of the center error signal.

The method may further include reducing a deviation of a size of the center error signal by adjusting a gain of the center error signal.

The optical information storage medium system may include a spindle motor configured to revolve a disc which is an optical information storage medium, an unbalanced disc determining apparatus configured to determine whether the disc that is revolved by the spindle motor is unbalanced, a driving unit configured to control a driving speed of the spindle motor according to whether the disc is unbalanced, and an optical pickup configured to move in a radial direction of the disc and record information in the disc and/or reproduce information from the disc.

A noise reduction unit of the unbalanced disc determining apparatus may include a band pass filter configured to block noise components included in the center error signal.

The noise reduction unit of the unbalanced disc determining apparatus may further include an integrator configured to integrate a center error signal that has passed through the band pass filter.

Light reflected by the disc may be light used to record information in the disc and/or reproduce information from the optical information storage medium of the optical pickup.

The center error signal may be obtained from a push-pull signal detected by receiving the light reflected by the disc.

The unbalanced disc determining apparatus may further include a gain adjuster configured to reduce a deviation of a size of the center error signal by adjusting a gain of the center error signal.

The band pass filter may allow signals of a specific frequency band to pass through and block the rest of the frequency bands.

The band pass filter may block the high-frequency components and allow the valid center error signal to pass.

Other features and aspects may be apparent from the following detailed description, the drawings, and the claims.

Figure 1:
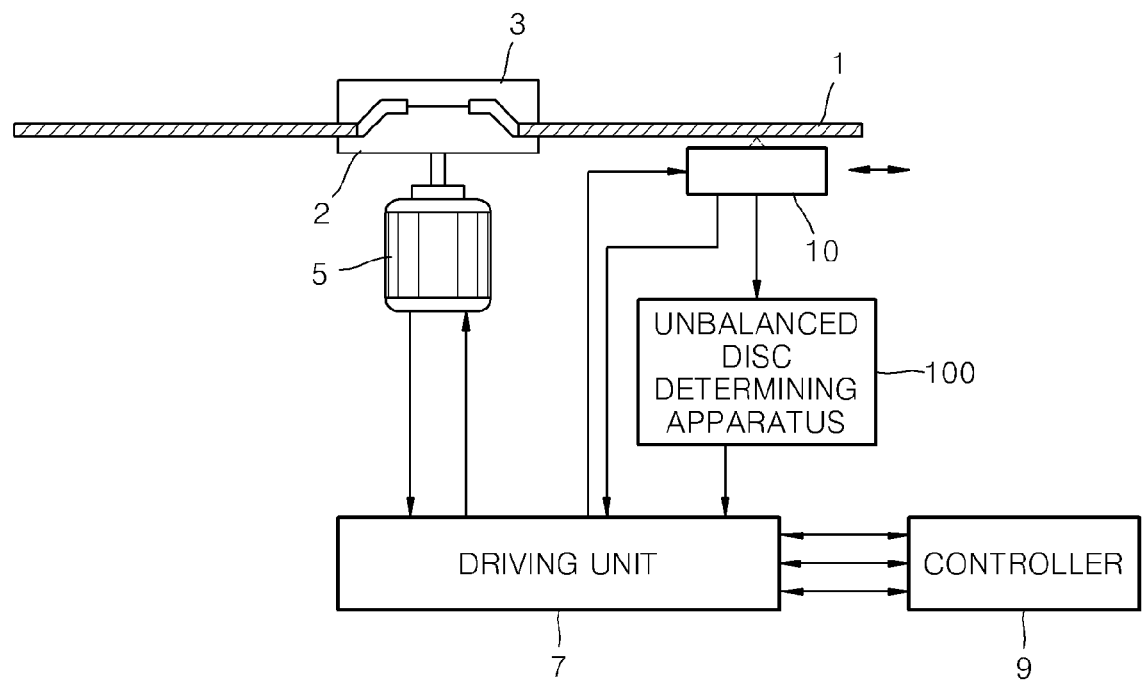
FIG. 1 is a view illustrating an example of a structure of an optical information storage medium system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
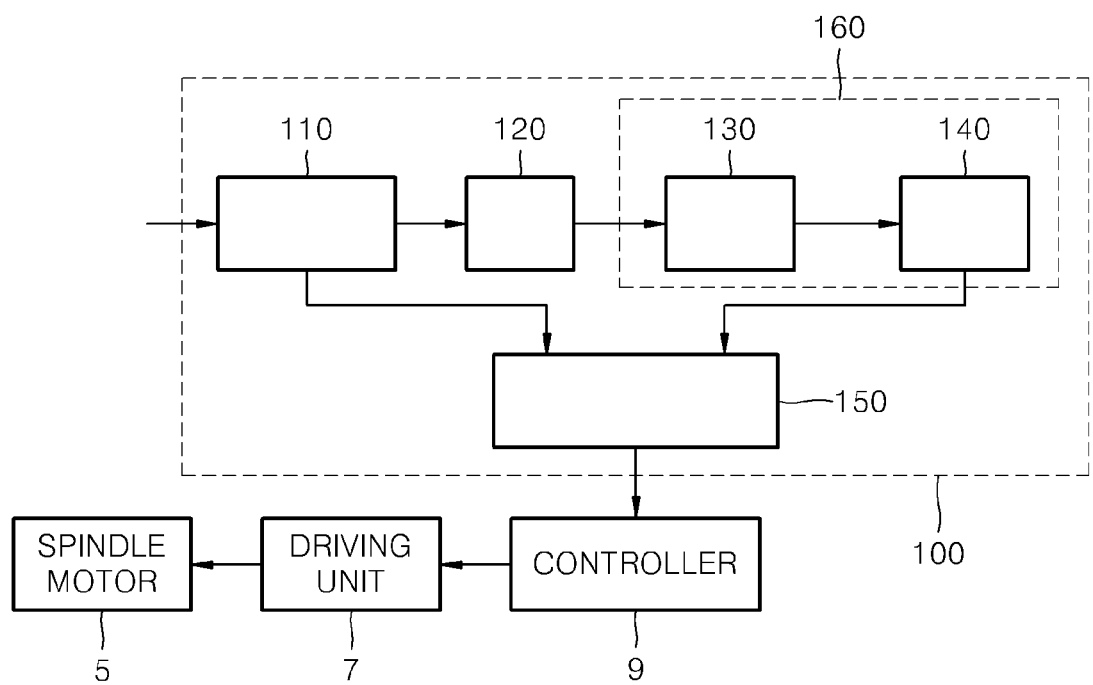
FIG. 2 is a block diagram illustrating an example of an unbalanced disc determining apparatus.

FIG. 1 illustrates an example of a structure of an optical information storage medium system using an unbalanced disc determining apparatus 100. FIG. 2 illustrates an example of the unbalanced disc determining apparatus 100.

Referring to FIG. 1, the optical information storage medium system includes a spindle motor 5, the unbalanced disc determining apparatus 100, a driving unit 7, and an optical pickup 10. The spindle motor 5 is configured to revolve a disc 1 installed in a turntable 2. The unbalanced disc determining apparatus 100 is configured to determine whether the disc 1 that is revolved by the spindle motor 5 is unbalanced. The driving unit 7 is configured to control a driving speed of the spindle motor 5. The optical pickup 10 is installed to move in a radial direction with respect to the disc 1 and is configured to reproduce from the disc 1 and/or record information to the disc 1. A controller 9 is configured to control the driving unit 7. A clamp 3 is used for chucking the disc 1.

The spindle motor 5 is configured to revolve the turntable 2, which is coupled to a pivot of the spindle motor 5. Thus, the disc 1 installed on the turntable 2 revolves.

As understood by one of ordinary skill in the art, the optical pickup 10 has an optical structure including a light source configured to emit light used for recording/reproducing of an optical information storage medium, an object lens configured to focus the light emitted from the light source on the disc 1 installed in the turntable 2, and a photodetector configured to detect the light reflected by the disc 1 to detect a reproducing signal or an error signal used for controlling, for example, focusing, tracking servo, or the like. A configuration and an operation of a basic optical system of the optical pickup 10 is understood by one of ordinary skill in the optical information storage medium system field. Thus, a detailed description and drawings thereof are omitted for conciseness.

The light emitted from the light source of the optical pickup 10 may be focused by the object lens and reflected by the disc 1. The photodetector for recording/reproducing may receive the light reflected by the disc 1. The photodetector for recording/reproducing may be included in the optical pickup 10. The received light may be photoelectric-converted into an electrical signal. A signal detecting circuit may process the electrical signal. The reproducing signal or the error signal used for controlling, for example, focusing, tracking servo, or the like, obtained from the signal detecting circuit may be input to the controller 9 via the driving unit 7. Also, the unbalanced disc determining apparatus 100 may obtain an unbalanced disc determining signal, and the unbalanced disc determining signal may be transmitted to the driving unit 7 and input to the controller 9 via the driving unit 7. The driving unit 7 may drive the optical pickup 10 based on a controlling operation of the controller 9 and control a revolution speed of the spindle motor 5. The driving unit 7 allows the spindle motor 5 to be driven at a predetermined revolution speed according to whether the disc 1 installed in the turntable 2 is unbalanced.

In this regard, the object lens may actuates the light reflected by the disc 1 in a tracking direction and a focusing direction according to the focus error signal or the tracking error signal. The focus error signal or the tracking error signal may be obtained from the signal detected by the photodetector for recording/reproducing.

The controller 9 may be configured to transmit again a focus servo command, a track servo command, or the like adjusted based on the signal obtained from the signal detecting circuit of the optical pickup 10 to the driving unit 7 to allow a servo operation of the optical pickup 10. For example, the servo operation of the optical pickup 10 may perform focusing, tracking controlling, or the like. Also, the controller 9 may transmit a predetermined driving command of the spindle motor 5 to the driving unit 7 based on the unbalanced disc determining signal obtained from the unbalanced disc determining apparatus 100. The predetermined driving command of the spindle motor 5 may allow the spindle motor 5 to revolve a predetermined number of revolutions. In FIG. 1, the signals obtained from the signal detecting circuit and the unbalanced disc determining apparatus 100 may be input to the controller 9 via the driving unit 7. As another aspect, the present example may not be limited thereto. In other words, the optical information storage medium system may be configured so that the signals may be directly input to the controller 9 without going through the driving unit 7 and the driving unit 7 may drive the optical pickup 10 and the spindle motor 5 according to a control signal transmitted from the controller 9.

The unbalanced disc determining apparatus 100 according to the current example includes the disc 1 installed in the turntable 2 and is configured to be revolved by the spindle motor 5 according to a center error signal obtained from a signal having detected light emitted from a light source for recording/reproducing of the optical pickup 10 and reflected by the disc 1.

Referring to FIG. 2, the example of the unbalanced disc determining apparatus 100 includes a center error signal obtaining unit 110, a noise reduction unit 160, and a determination unit 150. The center error signal obtaining unit 110 may be configured to detect a center error signal. The noise reduction unit 160 may be configured to reduce noise components of the center error signal. The determination unit 150 may be configured to determine whether the disc 1 installed in the turntable 2 is unbalanced.

The center error signal may be obtained from a signal having detected light reflected by the disc 1 revolved by the spindle motor 5. For example, the center error signal may be obtained from a push-pull signal. The push-pull signal may be detected by receiving the light reflected by the disc 1. As one example, the center error signal obtaining unit 110 may have a circuit configuration for detecting the push-pull signal. In response to the signal detecting circuit of the optical pickup 10 including a push-pull signal detecting unit, the push-pull signal detecting unit of the optical pickup 10 may be used as the center error signal obtaining unit 110. The disc 1 may be an optical information storage medium configured to record/reproduce information using the optical pickup 10, and the light reflected by the disc 1 to obtain the center error signal may be light used to record information to the optical information storage medium or reproduce information from the optical information storage medium. In other words, the light reflected by the disc 1 may be light emitted from the light source for recording/reproducing of the optical pickup 10.

Figure 3:
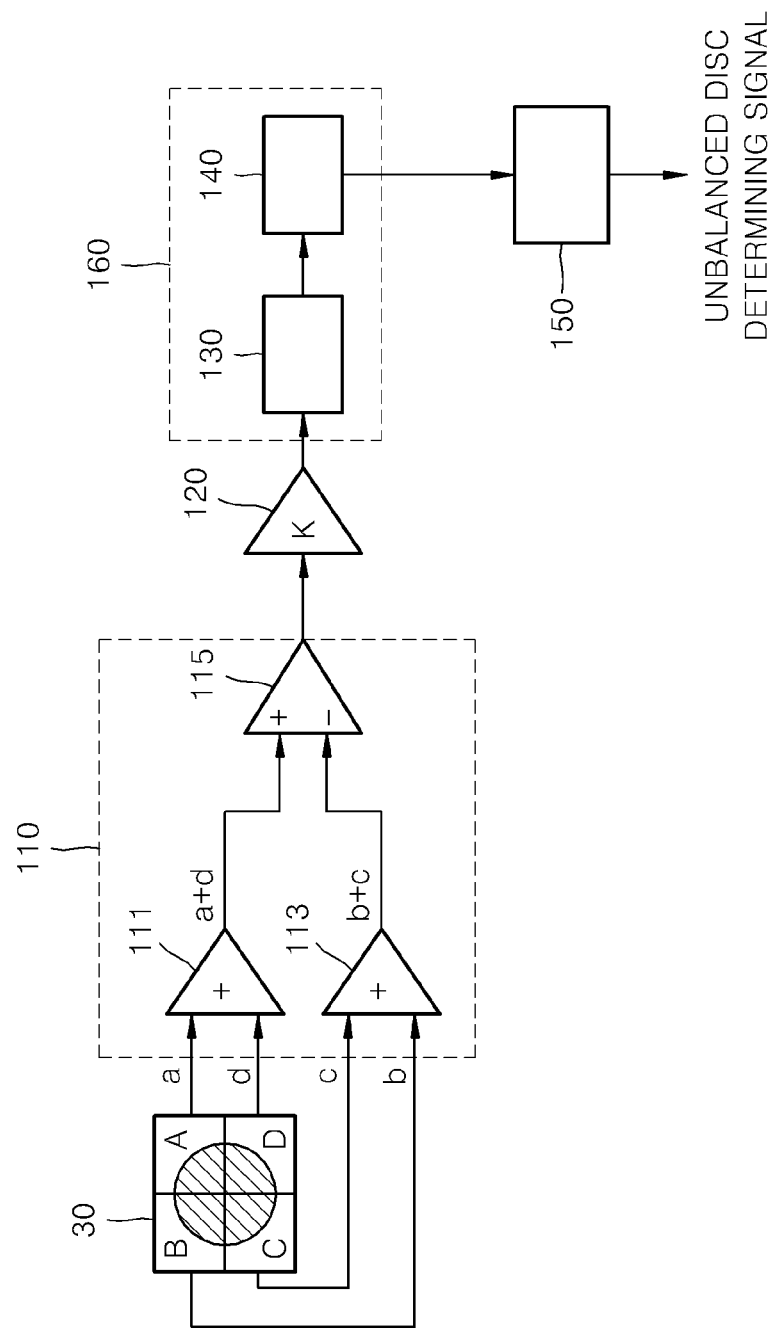
FIG. 3 is a view illustrating an example of a structure of a center error signal obtaining unit of FIG. 2.

Referring to FIG. 3, the center error signal may be obtained from a signal photoelectric-converted by receiving light. The light may be reflected by the disc 1 in a photodetector 30. The photodetector 30 may be disposed in the optical pickup 10 configured to record information to the disc 1 and/or reproduce information from the disc 1. The photodetector 30 may be configured to detect a reproducing signal of the recorded information or an error signal for focusing, tracking controlling, or the like. The photodetector 30 may be partitioned into two or more sections configured to detect the push-pull signal. As an example, FIG. 3 illustrates an example of the photodetector 30 being partitioned into four sections. The photodetector 30 may be, from among photodetector units included in the optical pickup 10, a main photodetector used to detect a reproducing signal or a focus error signal via astigmatism. As understood by one of ordinary skill in the art, in response to a tracking error being detected using a three-beam method or a differential push-pull (DPP) method, among the photodetector units, sub-photodetectors may be disposed on both sides of the main photodetector.

In response to signals detected in four light-receiving areas A, B, C, and D being referred to as a, b, c, and d, respectively, the signals a and d may be positioned at a side in a radial direction and the signals b and c may be positioned at the other side in a radial direction are input to the center error signal obtaining unit 110. The signals a and d may be detected in light-receiving areas A and D. The signals b and c may be detected in light-receiving areas B and C.

The center error signal obtaining unit 110 includes a first summer 111, a second summer 113, and a subtracter 115. The first summer 111 may be configured to generate a first sum signal a+d by receiving the detected signals a and d. The second summer 113 may be configured to generate a second sum signal b+c by receiving the detection signals b and c. The subtracter 115 may be configured to substract the second sum signal b+c input by the second summer 113 from the first sum signal a+d input by the first summer 111 to generate a center error signal (a+d)−(b+c), in other words, a push-pull signal.

The noise reduction unit 160 may reduce noise components included in the center error signal obtained by the center error signal obtaining unit 110 and may include a band pass filter 130. The band pass filter 130 may be configured to allow signals of a specific frequency band to pass through and block the rest of the frequency bands. The noise reduction unit 160 may further include an integrator 140.

The noise components included in the center error signal may be high-frequency components, compared to a valid center error signal. The band pass filter 130 may block the noise components included in the center error signal. In other words, the band pass filter 130 may block the high-frequency components and allow the valid center error signal to pass. In response to the band pass filter 130 being used as described above, noise components of a measured raw signal may be reduced. Thus a high-quality center error signal may be obtained. The integrator 140 may be configured to integrate the center error signal that has passed through the band pass filter 130. The integrator 140 may prevent the center error signal from being wrongly measured due to external factors such as defects, scratches, write defects, or the like of the disc 1.

The unbalanced disc determining apparatus 100 according to the current example may include a gain adjuster 120 configured to control a gain of the center error signal detected by the center error signal obtaining unit 110. The gain adjuster 120, as illustrated in FIGS. 2 and 3, may be disposed between the center error signal obtaining unit 110 and the noise reduction unit 160. In another example, the gain adjuster 120 may be disposed at any location between the center error signal obtaining unit 110 and the determination unit 150. The unbalanced disc determining apparatus 100 according to the current example may decrease a deviation of a size of the center error signal due to the inclusion of the gain adjuster 120 in relation to a deviation of a size of the center error signal without the inclusion of the gain adjuster 120.

Referring back to FIG. 2, the determination unit 150 may determine whether the disc 1 is an unbalanced disc or a normal disc by using the obtained center error signal. The determination unit 150 may determine whether a measured value of the center error signal exceeds a reference value to output an unbalanced disc determining signal where the center error signal has its noise reduced by passing the obtained center error signal through the noise reduction unit 160. In response to the measured value of the center error signal exceeding the reference value, the disc 1 installed in the turntable 2 may be determined to be unbalanced. As another aspect, in response to the measured value of the center error signal not exceeding the reference value, the disc 1 installed in the turntable 2 may be determined to be within a normal scope (for example is balanced).

In response to the determination unit 150 determining that the disc 1 is unbalanced, the controller 9 may transmit a command for decreasing a revolution speed of the spindle motor 5 to the driving unit 7, and the driving unit 7 may reduce the revolution speed of the spindle motor 5 according to the command. As another aspect, in response to the determination unit 150 determining that the disc 1 is not unbalanced, in other words, the disc 1 is within a normal scope, the driving unit 7 may maintain a revolution speed of the spindle motor 5 by not decreasing the revolution speed of the spindle motor 5 to maintain the number of revolutions of the disc 1 or may increase the revolution speed of the spindle motor 5 to reach a desired revolution speed.

In FIGS. 2 and 3, the determination unit 150 and the controller 9 are independently included, but the present invention is not limited to that configuration. In other words, the optical information storage medium system may have the controller 9 include functions of the determination unit 150.

According to the unbalanced disc determining apparatus 100 of the current example, a center error signal is obtained from a signal having detected light reflected by the disc 1 revolved by the spindle motor 5, noise components of the center error signal is reduced, and a determination is made whether the disc 1 is unbalanced based on a comparison of the center error signal of which noise is reduced with a reference value. An allowance of the center error signal to pass through the band pass filter 130 may perform the reduction in the noise components included in the center error signal. Also, as an example, the center error signal that has passed through the band pass filter 130 may be integrated by the integrator 140. By performing the integrating process, more noise components due to external factors such as defects, scratches, write defects, or the like may be removed. Thus, due to the removal of the noise components being removed, the center error signal may be prevented from being wrongly measured due to the external factors. Also, a size of the center error signal may vary according to a reflectivity of the disc 1 installed in the turntable 2 or according to which recording layer light is reflected by in response to the disc 1 being a multi-layered disc, and adjusting a gain of the center error signal may reduce the deviation of the size of the center error signal.

Figure 4:
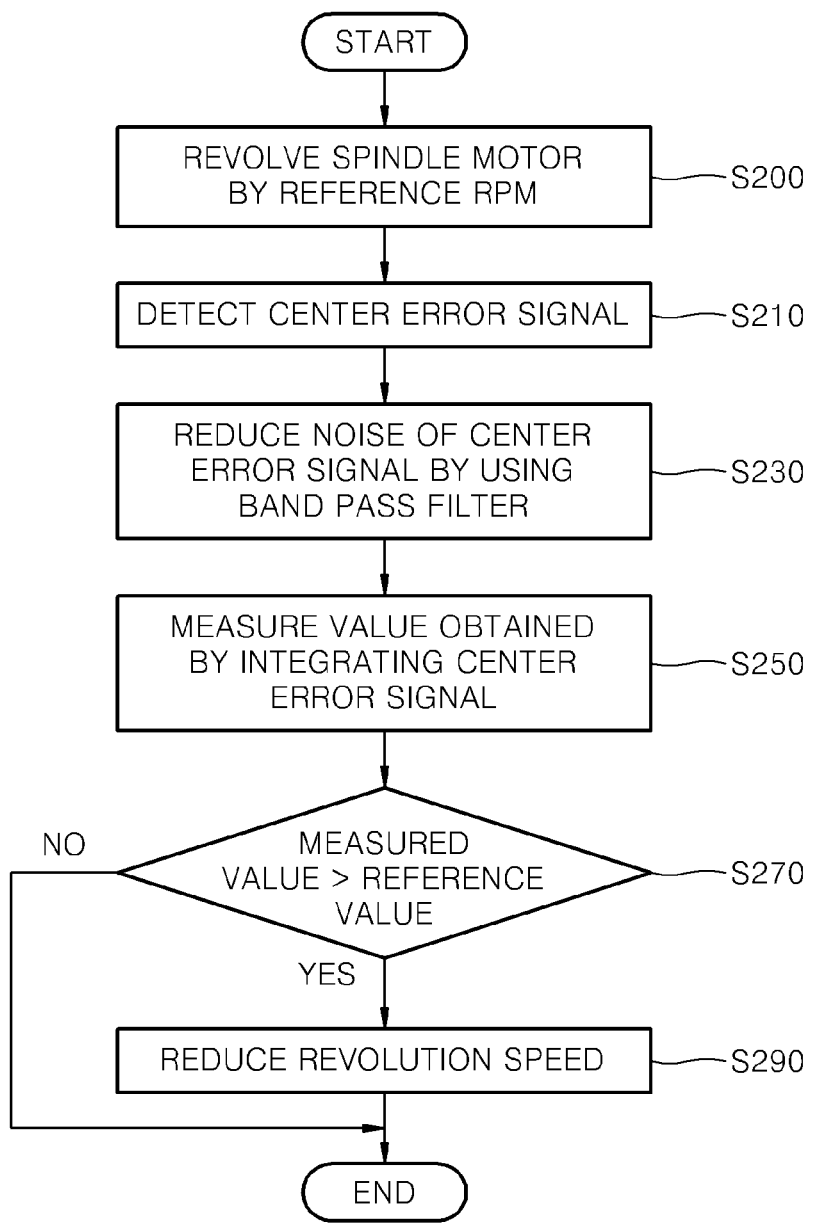
FIG. 4 is a flowchart illustrating an example of an unbalanced disc determination method.

FIG. 4 illustrates an example of a flowchart showing an unbalanced disc determination method.

In response to the disc 1 being installed in the turntable 2, the spindle motor 5 is revolved by a reference revolutions per minute (RPM) (S200). Accordingly, the disc 1 is revolved at the reference RPM. In this regard, the reference RPM corresponds to the number of revolutions in which in response to the disc 1 installed in the turntable 2 being within a normal scope, a center error signal to be detected corresponds to a reference value for determining whether the disc 1 is unbalanced or the center error signal represents a value within a predetermined scope with respect to the reference value.

In response to the disc 1 installed in the turntable 2 being determined to be within a normal scope, the number of revolutions of the disc 1 at a maximum revolution speed may be determined within a threshold limit value of the optical information storage medium system, and a reference number of revolutions in which the center error signal detected during the revolutions of the disc 1 within a normal scope is an optimal value may be determined.

In other words, in response to the disc 1 installed in the turntable 2 revolving at a constant speed, in response to the disc 1 installed in the turntable 2 falling within a normal scope, a center error signal to be detected corresponds to a reference value or the center error signal represents a value within a predetermined scope with respect to the reference value, or in response to the disc 1 installed in the turntable 2 being unbalanced outside of a threshold limit value, a reference number of revolutions in which the center error signal represents a value outside of a predetermined scope with respect to the reference value may be determined.

As described above, in response to the disc 1 installed in the turntable 2 being revolved by the reference number of revolutions by revolving the spindle motor 5 by the reference number of revolutions, a center error signal is detected by the center error signal obtaining unit 110 from a signal having detected light reflected by the disc 1 (S210). As described above with reference to FIG. 3, the center error signal may be obtained as a push-pull signal by the photodetector 30 from a signal having detected light emitted from a light source of the optical pickup 10 and reflected by the disc 1.

The center error signal obtaining unit 110 may obtain a reduced noise of the center error signal (S230, S250). For example, in order to reduce noise of the center error signal, the center error signal obtained by the center error signal obtaining unit 110 passes through the band pass filter 130 (S230). Then, a value obtained by integrating the center error signal may be measured using the integrator 140 (S250).

The determination unit 150 compares a measured value of the center error signal of which noise is reduced with a reference value (S270). In response to the measured value being greater than the reference value, the determination unit 150 determines the disc 1 installed in the turntable 2 to be unbalanced. Thus, a revolution speed of the spindle motor 5 may be reduced (S290). As another aspect, in response to the measured value being less than the reference value, the determination unit 150 determines the disc 1 installed in the turntable 2 to be within a normal scope. Thus, a revolution speed of the spindle motor 5 is maintained at a reference number of revolutions or the revolution speed is increased to a normal revolution speed. Thus, the process of determining an unbalanced disc may be completed.

Figure 5:
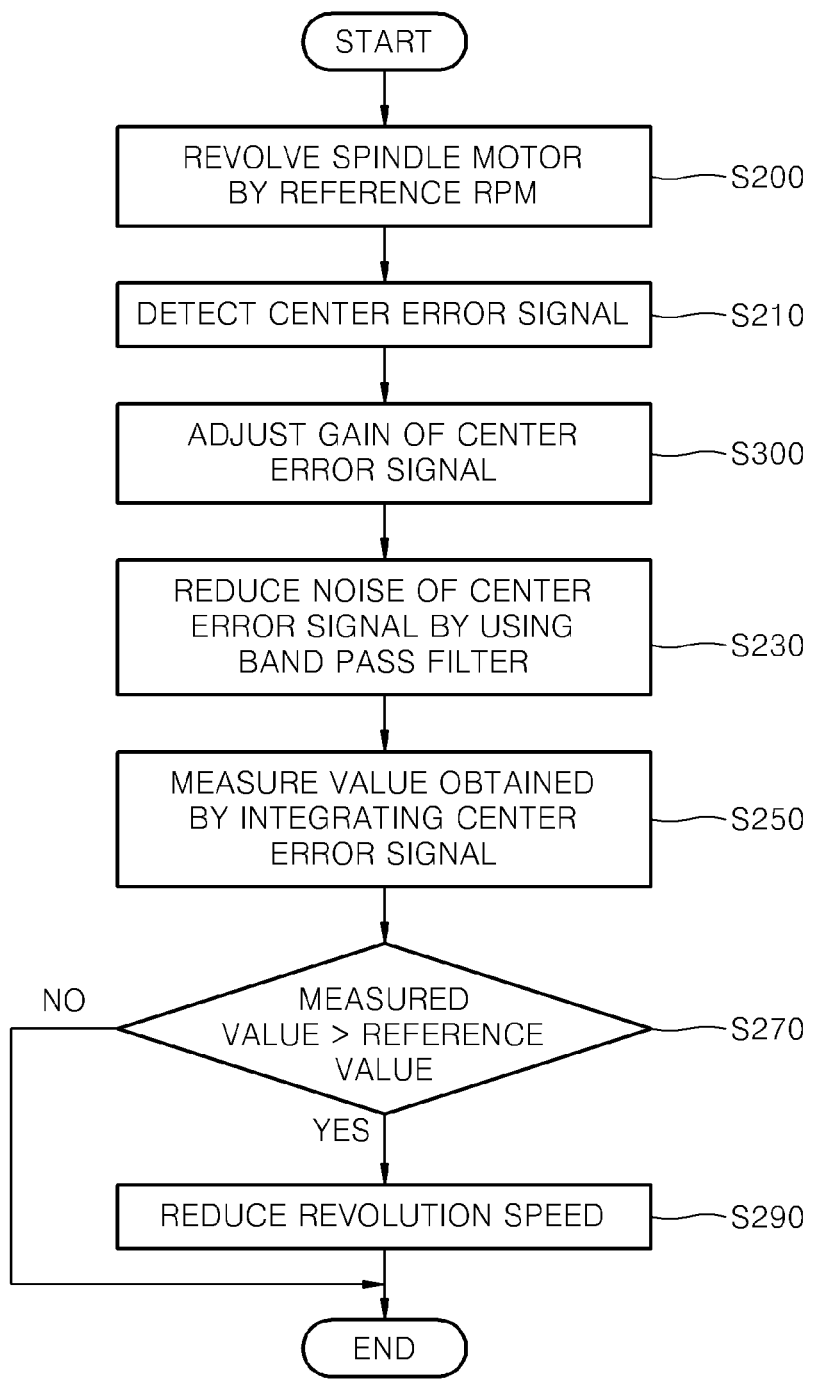
FIG. 5 is a flowchart illustrating another example of an unbalanced disc determination method.

In another example of a process of determining whether the disc 1 installed in the turntable 2 is unbalanced, a gain of a center error signal may be adjusted to reduce a deviation of a size of the center error signal, as illustrated in FIG. 5 (S300). FIG. 5 illustrates the gain of the center error signal being adjusted before the band pass filter 130 reduces noise after the center error signal is detected. The gain of the center error signal may be adjusted after passing through the band pass filter 130 or after measuring a value obtained by integrating the center error signal.

The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An unbalanced disc determining apparatus comprising:
a noise reduction unit configured to reduce noise components of a center error signal obtained from a signal configured to detect light reflected by a disc revolved by a spindle motor; and
a determination unit configured to determine whether the revolving disc is unbalanced by determining whether the center error signal of which noise is reduced exceeds a reference value,
wherein the noise reduction unit comprises a band pass filter configured to block high-frequency noise components and allow a valid center error signal to pass.

2. The unbalanced disc determining apparatus of claim 1, wherein the noise reduction unit further comprises an integrator configured to integrate a center error signal that has passed through the band pass filter.

3. The unbalanced disc determining apparatus of claim 2, wherein the light reflected by the disc is light used to record information in the disc and/or reproduce information from the disc.

4. The unbalanced disc determining apparatus of claim 3, wherein the center error signal is obtained from a push-pull signal detected by receiving the light reflected by the disc.

5. The unbalanced disc determining apparatus of claim 1, wherein the light reflected by the disc is light used to record information in the disc and/or reproduce information from the disc.

6. The unbalanced disc determining apparatus of claim 5, wherein the center error signal is obtained from a push-pull signal detected by receiving the light reflected by the disc.

7. The unbalanced disc determining apparatus of claim 1, further comprising a gain adjuster configured to reduce a deviation of a size of the center error signal by adjusting a gain of the center error signal.

8. An optical information storage medium system comprising:
the unbalanced disc determining apparatus of claim 1;
a spindle motor configured to revolve a disc which is an optical information storage medium;
a driving unit configured to control a driving speed of the spindle motor according to whether the disc is unbalanced; and
an optical pickup configured to move in a radial direction of the disc and record information in the disc and/or reproduce information from the disc.

9. The optical information storage medium system of claim 8, wherein a noise reduction unit of the unbalanced disc determining apparatus comprises a band pass filter configured to block noise components included in the center error signal.

10. The optical information storage medium system of claim 9, wherein the noise reduction unit of the unbalanced disc determining apparatus further comprises an integrator configured to integrate a center error signal that has passed through the band pass filter.

11. The optical information storage medium system of claim 8, wherein light reflected by the disc is light used to record information in the disc and/or reproduce information from the optical information storage medium of the optical pickup.

12. The optical information storage medium system of claim 11, wherein the center error signal is obtained from a push-pull signal detected by receiving the light reflected by the disc.

13. The optical information storage medium system of claim 8, wherein the unbalanced disc determining apparatus further comprises a gain adjuster configured to reduce a deviation of a size of the center error signal by adjusting a gain of the center error signal.

14. The unbalanced disc determining apparatus of claim 1, wherein the band pass filter allows signals of a specific frequency band to pass through and blocks the rest of the frequency bands.

15. The unbalanced disc determining apparatus of claim 1, wherein in response to the determination unit determining that the disc is unbalanced, a controller transmits a command for decreasing a revolution speed of the spindle motor, and in response to the determination unit determining that the disc is not unbalanced, the driving unit maintains or increases a revolution speed of the spindle motor.

16. An unbalanced disc determination method comprising:
reducing noise components of a center error signal obtained from a signal having detected light reflected by a disc revolved by a spindle motor by blocking high-frequency noise components and allowing a valid center error signal to pass; and
determining whether the disc is unbalanced by comparing the center error signal of which noise is reduced with a reference value.

17. The method of claim 16, wherein the reducing of the noise components further comprises integrating the center error signal that has passed through the band pass filter.

18. The method of claim 17, further comprising reducing a deviation of a size of the center error signal by adjusting a gain of the center error signal.

19. The method of claim 16, further comprising reducing a deviation of a size of the center error signal by adjusting a gain of the center error signal.

* * * * *